US011400525B2

(12) United States Patent
Martin et al.

(10) Patent No.: US 11,400,525 B2
(45) Date of Patent: Aug. 2, 2022

(54) TOOLS AND METHODS FOR REFACING TUBULAR ENDS FORMING A THREADED CONNECTION

(71) Applicant: Grant Prideco, L.P., Houston, TX (US)

(72) Inventors: Floyd Martin, Navasota, TX (US);
Dan Morgan, Navasota, TX (US);
Edgar Stokley, Montgomery, TX (US);
Andrei Muradov, Houston, TX (US)

(73) Assignee: Grant Prideco, L.P.

( * ) Notice: Subject to any disclaimer, the term of this patent is extended or adjusted under 35 U.S.C. 154(b) by 0 days.

(21) Appl. No.: 17/012,838

(22) Filed: Sep. 4, 2020

(65) Prior Publication Data

US 2022/0072640 A1   Mar. 10, 2022

(51) Int. Cl.
*B23B 51/10* (2006.01)

(52) U.S. Cl.
CPC ...... *B23B 51/103* (2013.01); *B23B 2260/088* (2013.01)

(58) Field of Classification Search
CPC ............... B23B 51/101; B23B 51/103; B23B 2260/088
See application file for complete search history.

(56) References Cited

U.S. PATENT DOCUMENTS

| 731,277 | A | | 6/1903 | Burton | |
|---|---|---|---|---|---|
| 2,528,474 | A | | 10/1950 | Moore | |
| 2,855,812 | A | * | 10/1958 | Fried | B23B 51/101 82/1.5 |
| 3,658,435 | A | * | 4/1972 | Kubicek | B23Q 11/04 408/239 R |
| 3,661,473 | A | * | 5/1972 | Kubicek | B23B 51/101 408/239 R |
| 3,765,790 | A | * | 10/1973 | Kubicek | B23B 31/028 408/239 R |
| 3,975,111 | A | * | 8/1976 | Kubicek | B23B 51/101 408/239 R |
| 4,130,034 | A | | 12/1978 | Benoit | |
| 4,149,436 | A | | 4/1979 | Blattler | |
| 4,440,531 | A | * | 4/1984 | Astle | B23B 51/107 408/229 |
| 4,665,780 | A | | 5/1987 | Plaquin et al. | |
| 4,709,604 | A | * | 12/1987 | Rogers | B23C 1/20 29/27 A |
| 5,433,130 | A | | 7/1995 | Smith et al. | |
| 5,852,962 | A | | 12/1998 | Fraering, Jr. | |

(Continued)

OTHER PUBLICATIONS

International Search Report and Written Opinion issued in International application serial No. PCT/US2021/046889, dated Dec. 8, 2021, 8 pages.

*Primary Examiner* — Eric A. Gates
(74) *Attorney, Agent, or Firm* — Jonathan Pierce; Pierre Campanac; Porter Hedges LLP

(57) ABSTRACT

A refacing tool includes a feed assembly that holds a first set of cutters positioned for refacing the inner shoulder of a pin or box end of a tubular and a second set of cutters positioned for refacing the outer shoulder of the pin or box end. The axial spacing between the first set of cutters and the second set of cutters is fixed and determined by the geometry of the feed assembly. The refacing tool can simultaneously reface the inner shoulder and the outer shoulder, as well as chamfers.

30 Claims, 11 Drawing Sheets

(56) References Cited

U.S. PATENT DOCUMENTS

| | | | |
|---|---|---|---|
| 6,220,130 B1 | 4/2001 | Beakley | |
| 6,279,437 B1 | 8/2001 | Way | |
| 8,784,161 B1 | 7/2014 | Burleson et al. | |
| D719,990 S | 12/2014 | Manwaring et al. | |
| D721,794 S | 1/2015 | Manwaring et al. | |
| D737,640 S | 9/2015 | Manwaring | |
| D762,739 S | 8/2016 | Manwaring | |
| D768,473 S | 10/2016 | Manwaring et al. | |
| 9,459,082 B2 * | 10/2016 | Giraud | F42B 33/004 |
| 2001/0029817 A1 | 10/2001 | Strait | |
| 2002/0053267 A1 | 5/2002 | Zanin | |
| 2012/0132044 A1 | 5/2012 | Manwaring | |
| 2012/0180609 A1 | 7/2012 | Leblanc et al. | |
| 2014/0234042 A1 * | 8/2014 | Faessler | B23B 51/101 408/1 R |
| 2015/0047478 A1 | 2/2015 | DHooge | |

* cited by examiner

TOOLS AND METHODS FOR REFACING TUBULAR ENDS FORMING A THREADED CONNECTION

CROSS-REFERENCE TO RELATED APPLICATIONS

None

BACKGROUND

This disclosure relates generally to tools and methods for refacing tubular ends forming a threaded connection. This disclosure relates more particularly to tools that are portable and suitable for refacing tubular ends forming a rotary-shouldered connection, and to methods of use of such tools.

FIG. 1 illustrates a rotary-shouldered connection 100 between a first tubular 102a having a pin end and a second tubular 102b having a box end. The pin end of the first tubular 102a includes an inner shoulder 104a, a thread 108a, and an outer shoulder 106a. Similarly, the box end of the second tubular 102b includes an inner shoulder 104b, a thread 108b, and an outer shoulder 106b. When the rotary-shouldered connection 100 is made up, and the thread 108a fully engages the thread 108b, the inner shoulder 104a may engage the inner shoulder 104b to form torque stop and, essentially simultaneously, the outer shoulder 106a may engage the outer shoulder 106b to form an outer metal-to-metal seal. To ensure that inner and outer shoulders engage essentially simultaneously, a spacing 110a between the inner shoulder 104a and the outer shoulder 106a should be approximately equal to the spacing 110b between the inner shoulder 104b and the outer shoulder 106b.

In use, as the rotary-shouldered connection 100 is made up, torqued, and broken several times, the inner and/or outer shoulders may deform so that the inner and outer metal-to-metal shoulder contacts can no longer be formed essentially simultaneously. When this deformation has occurred and exceeded a set threshold, the inner shoulder 104a and outer shoulder 106a of the pin end of the first tubular 102a should be refaced, and similarly the inner shoulder 104b and outer shoulder 106b of the box end of the second tubular 102b should also be refaced to restore a spacing 110a essentially equal to the spacing 110b. Thus, the inner shoulders 104a,b and the outer shoulders 106a,b may again form inner and outer metal-to-metal shoulder contacts essentially simultaneously.

Thus, there is a continuing need in the art for apparatus and methods for refacing tubular ends forming threaded connections, such as the rotary-shouldered connection 100 illustrated in FIG. 1. Preferably, such apparatus and methods facilitate the restoration of a predetermined spacing between inner and outer shoulders on either a pin end or a box end of tubulars.

BRIEF SUMMARY OF THE DISCLOSURE

This disclosure describes a refacing tool, which may be used for refacing a tubular end having an inner shoulder, an outer shoulder, and threads for forming a connection.

The refacing tool may comprise a power tool. The power tool may include a housing, a handle attached to the housing, a propeller shaft coupled to the housing by a hinged joint, and a motor configured to provide a torque between the propeller shaft and the housing. Optionally, the power tool may comprise a foot pedal and drive electronics configured to control the motor based on a position of the foot pedal.

The refacing tool may comprise a sleeve assembly. The sleeve assembly may be releasably attached to the housing of the power tool.

The refacing tool may comprise a feed assembly. The feed assembly may be coupled to the sleeve assembly by a hinged joint. The feed assembly may comprise a drive shaft, an outer barrel rigidly coupled to the drive shaft, and an inner barrel rigidly coupled to the drive shaft. The drive shaft may be coupled to the propeller shaft of the power tool by a prismatic joint. The inner barrel may be positioned at least partially inside the outer barrel. For example, the inner barrel may comprise a shaft. The outer barrel may comprise a cylinder at least partially surrounding the shaft. Preferably, the cylinder may comprise windows. At least some of the windows may include a transparent shield.

The refacing tool may comprise cutters. The cutters may be coupled to the feed assembly so as to move in unison with the feed assembly. The cutters may be positioned so as to reface the inner shoulder or the outer shoulder of the tubular end. For example, the cutters may comprise at least a first cutter, which may be positioned so as to reface the inner shoulder of the tubular end, and at least a second cutter, which may be positioned so as to reface the outer shoulder of the tubular end. The first cutter may be rigidly coupled to the shaft forming the inner barrel included in the feed assembly. The second cutter may be rigidly coupled to the cylinder forming the outer barrel included in the feed assembly. The windows provided in the cylinder may be located such that the second cutter is visible to an operator. The refacing tool may reface the inner shoulder, or the outer shoulder, or preferably both shoulders simultaneously.

The refacing tool may comprise a drive assembly. Preferably, the position of the drive assembly may be decoupled from the rotation of the feed assembly. The drive assembly may be coupled to the sleeve assembly by a screw joint.

The refacing tool may comprise a rotating assembly. The rotating assembly may be coupled to the drive assembly by a hinged joint. The rotating assembly may pass through the feed assembly. The rotating assembly may rotate together with the feed assembly. The feed assembly may be capable of sliding relative to the rotating assembly, and thus the cutters that move in unison with the feed assembly may be capable of moving axially relative to the rotating assembly.

The refacing tool may comprise a mandrel assembly. The mandrel assembly may be coupled to the rotating assembly by a hinged joint. The mandrel assembly may include threads configured to engage the threads of the tubular end. Preferably, the threads precisely match the original equipment manufacture.

In some embodiments, the refacing tool may comprise a locking pin. The locking pin may be coupled to the rotating assembly so as to slide between a first position, wherein the locking pin does not engage the mandrel assembly, and a second position wherein the locking pin engages the mandrel assembly and prevents rotation of the mandrel assembly relative to the rotating assembly. The refacing tool may also comprise a cam. The cam may be coupled to the rotating assembly so as to slide between an unlock position, wherein the cam allows a spring to urge the locking pin in the first position, and a lock position, wherein the cam retains the locking pin in the second position. Alternatively, a knob, or other switching mechanisms, may be used to move the locking pin between the first position and the second position.

In some embodiments, the refacing tool may comprise a sensor indicative of an axial position of the cutters relative to the mandrel assembly. For example, the sleeve assembly may comprise marks forming a first graduated scale, and the drive assembly may comprise marks forming a second graduated scale, such that alignments of the marks are indicative of the axial position of the cutters relative to the mandrel assembly. The first graduated scale and the second graduated scale may form a Vernier.

This disclosure also describes a method of refacing a tubular end, which may have an inner shoulder, an outer shoulder, and threads for forming a connection. The method may comprise providing a refacing tool, as described above. The method may comprise coupling the threads of the tubular end to the threads of the mandrel assembly. The method may comprise applying a torque to the feed assembly. The method may comprise positioning the drive assembly to advance the cutters toward the tubular end while rotating the cutters. The method may comprise refacing the inner shoulder or the outer shoulder of the tubular end. Preferably, the method may comprise refacing the inner shoulder and the outer shoulder of the tubular end simultaneously.

BRIEF DESCRIPTION OF THE DRAWINGS

For a more detailed description of the embodiments of the disclosure, reference will now be made to the accompanying drawings, wherein.

DETAILED DESCRIPTION

This disclosure describes refacing tools that can simultaneously reface the inner shoulder and the outer shoulder of either a pin end or a box end forming a threaded connection. However, the refacing tools can also be used to reface only the inner shoulder or only the outer shoulder.

Moreover, the refacing tools described herein may comprise a sufficiently rigid, preferably integral, feed assembly that may hold a first cutter or set of cutters for refacing the inner shoulder and a second cutter or set of cutters for refacing the outer shoulder. Accordingly, the axial spacing between the first set of cutter(s) and the second set of cutter(s) may be fixed and determined by the geometry of the feed assembly. Because the axial spacing between the cutter(s) is fixed, the axial spacing between the refaced inner and the outer shoulders may also be fixed and precisely controlled by the geometry of the feed assembly.

In order to advance the cutter(s) toward the shoulders of the pin end or the box end that are being refaced, the refacing tools include a drive assembly that is configured to adjust the axial position of the cutter(s) relative to the pin end or the box end when the drive assembly is turned. The angular position of the drive assembly is decoupled from the rotation of the cutters held by the feed assembly. This angular position can be adjusted by an operator while the cutters are rotated, and the inner and outer shoulders are refaced. This angular position is preferably measured and is indicative of the axial position of the cutters relative to the pin end or the box end of the threaded connection.

Figure 1:
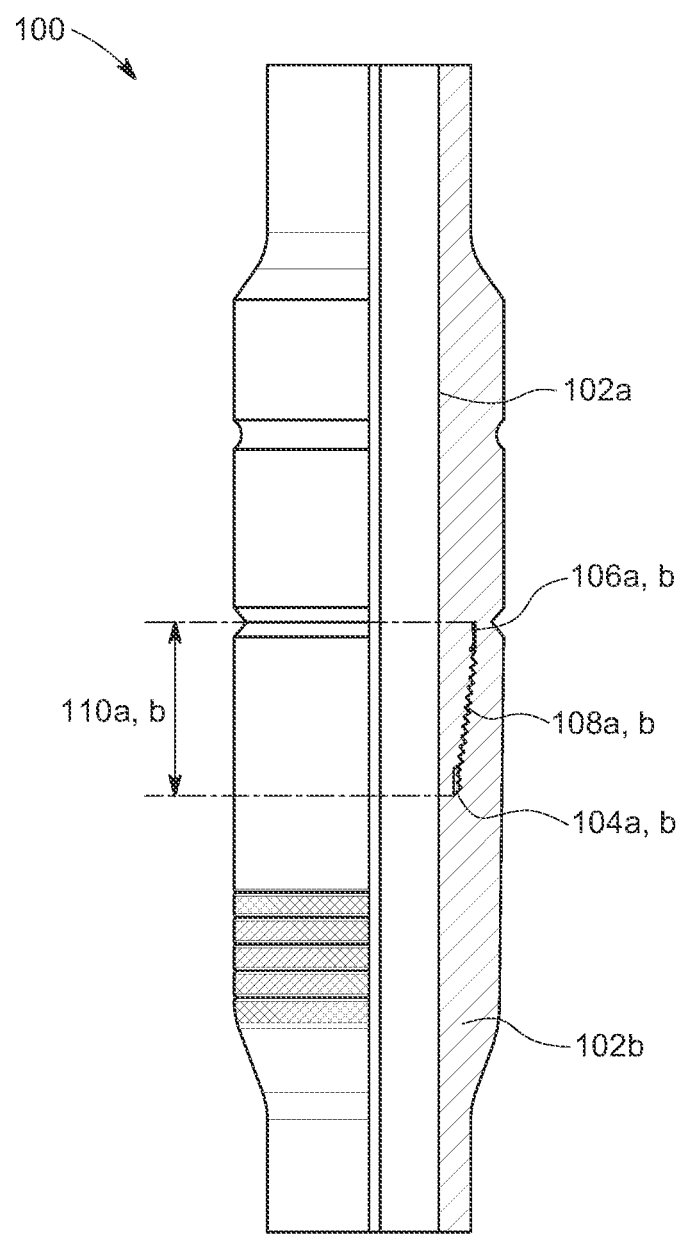
FIG. 1 is an elevation view, partially in cross-section, of a mated rotary-shouldered connection.
Figure 2:
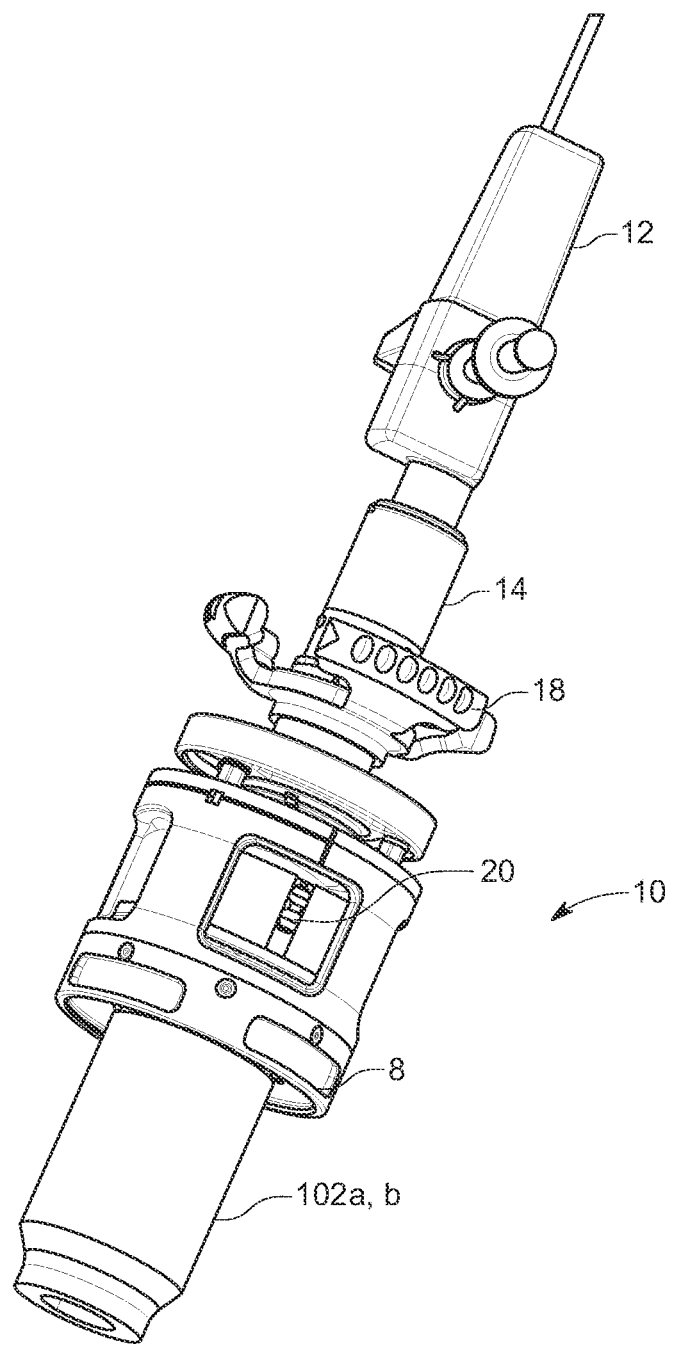
FIG. 2 is a perspective view of a tool for refacing a tubular end, the refacing tool including an attachable/releasable power tool and a cutting tool.
Figure 3:
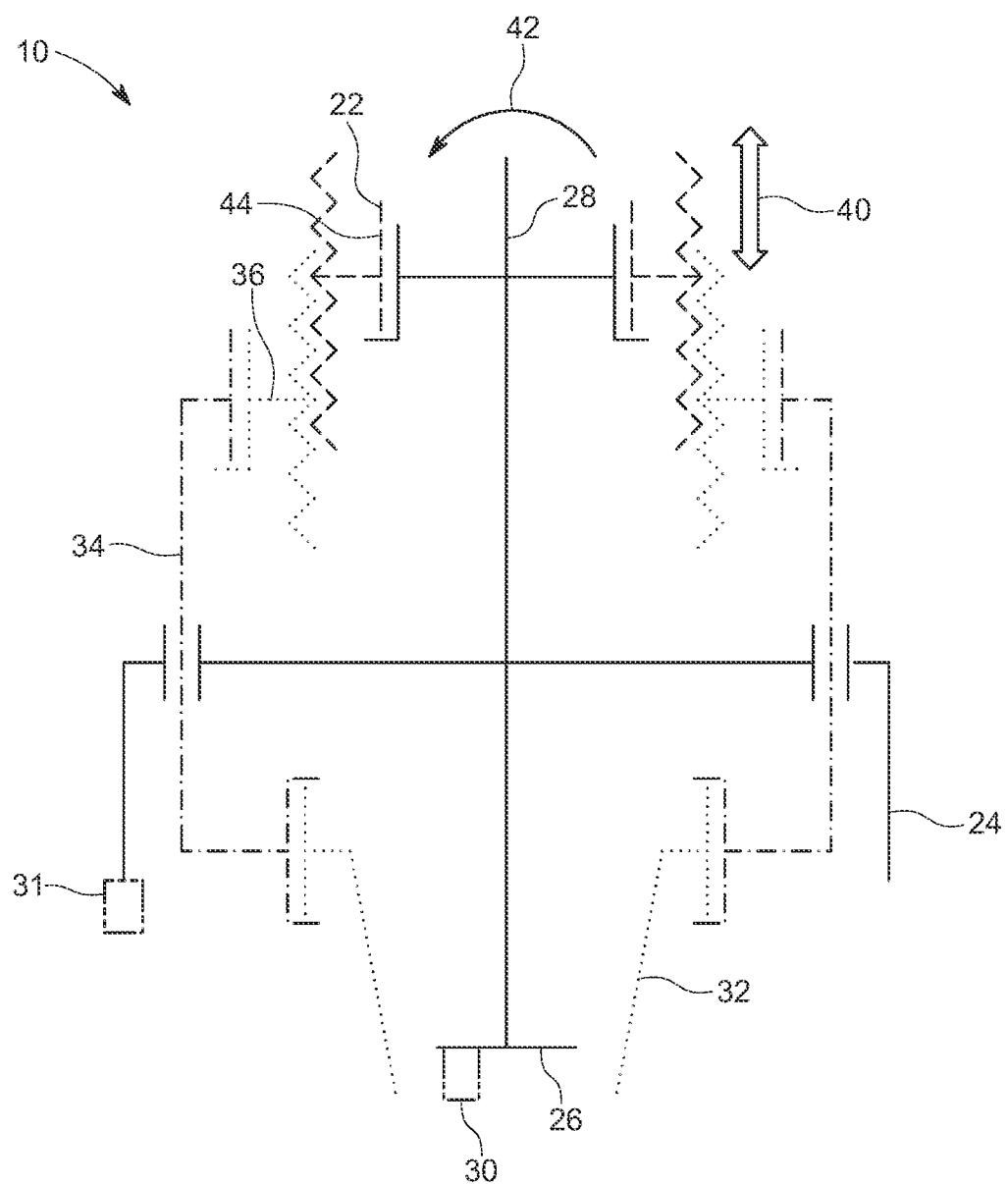
FIG. 3 is a schematic view of a cutting tool for refacing a box end of a tubular.
Figure 4:
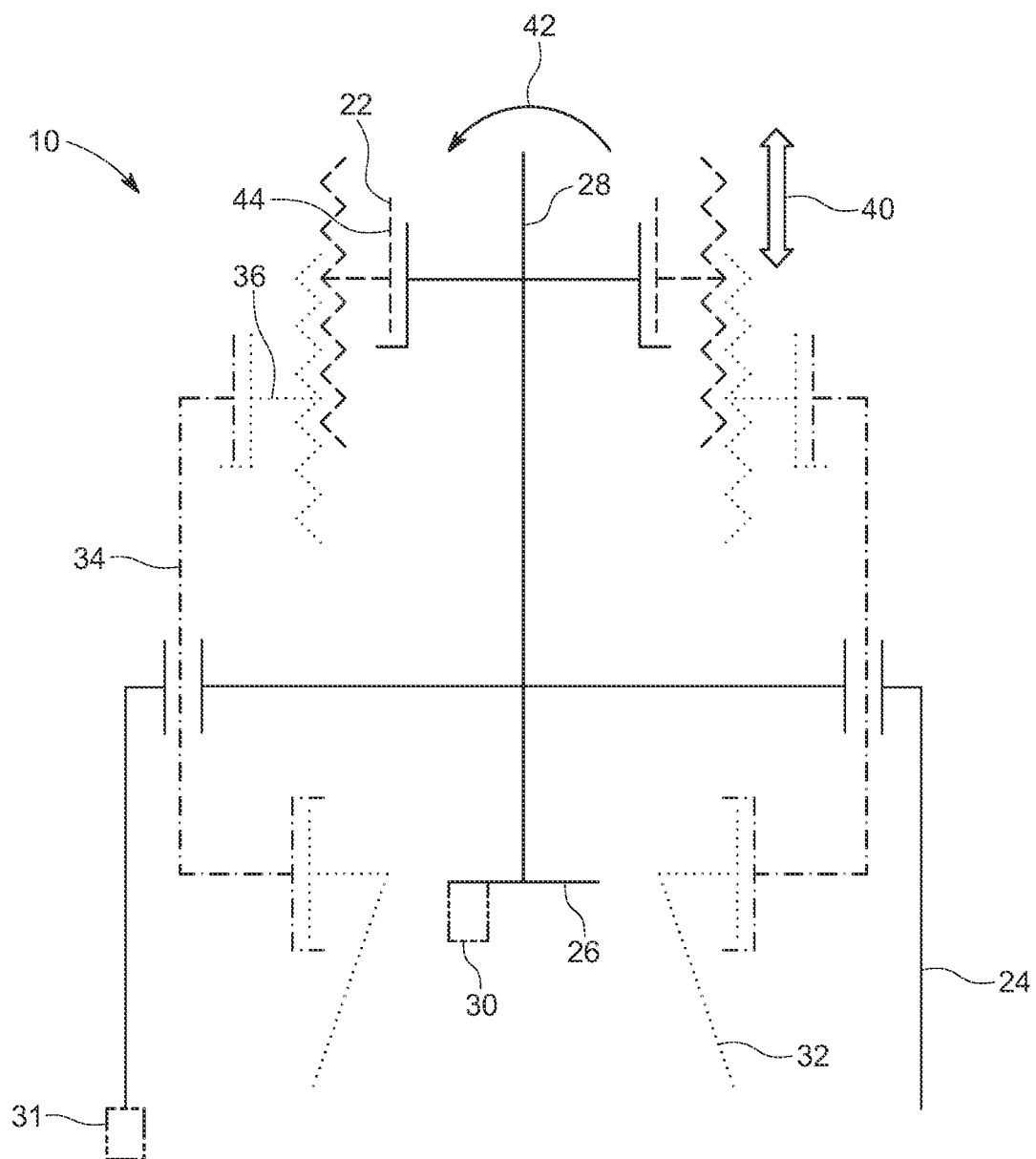
FIG. 4 is a schematic view of a cutting tool for refacing a pin end of a tubular.
Figure 5:
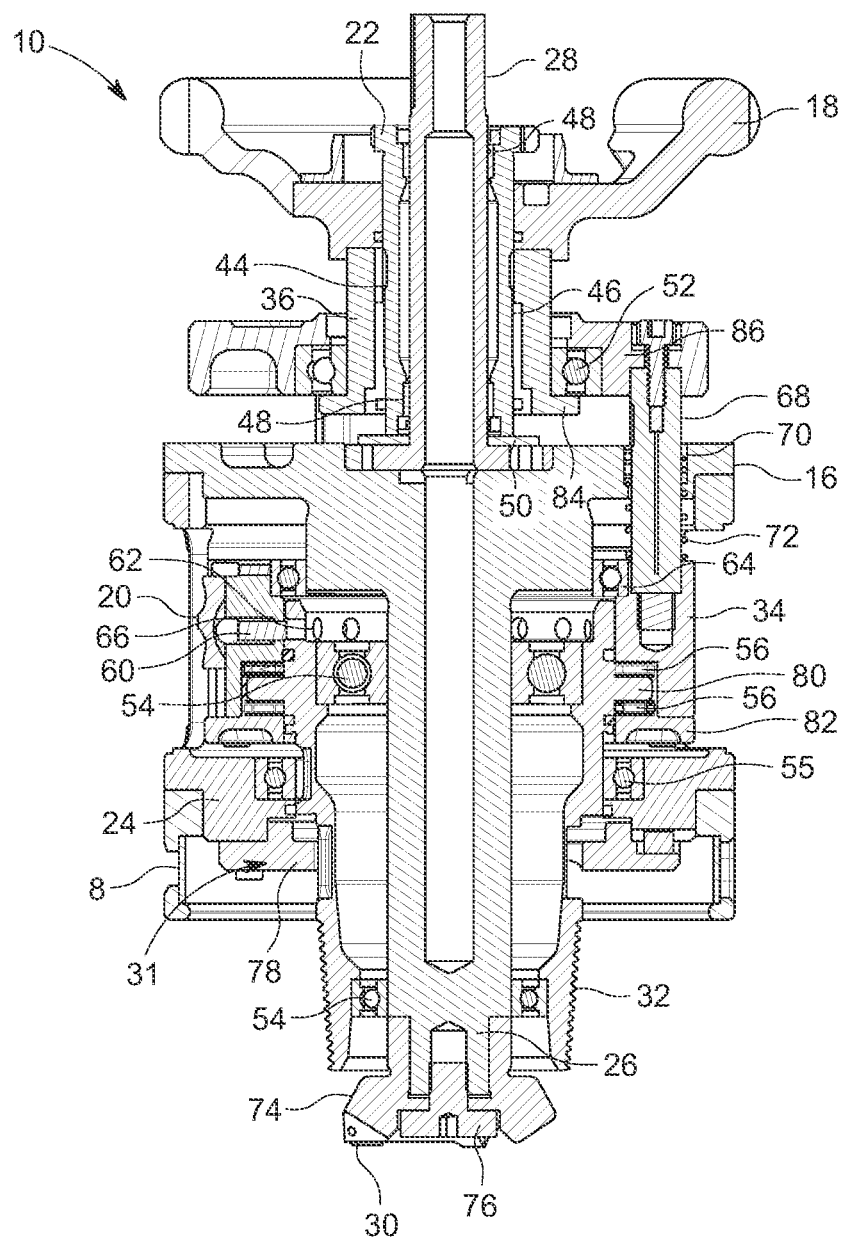
FIG. 5 is a sectional view of a cutting tool for refacing a box end of a tubular.
Figure 6:
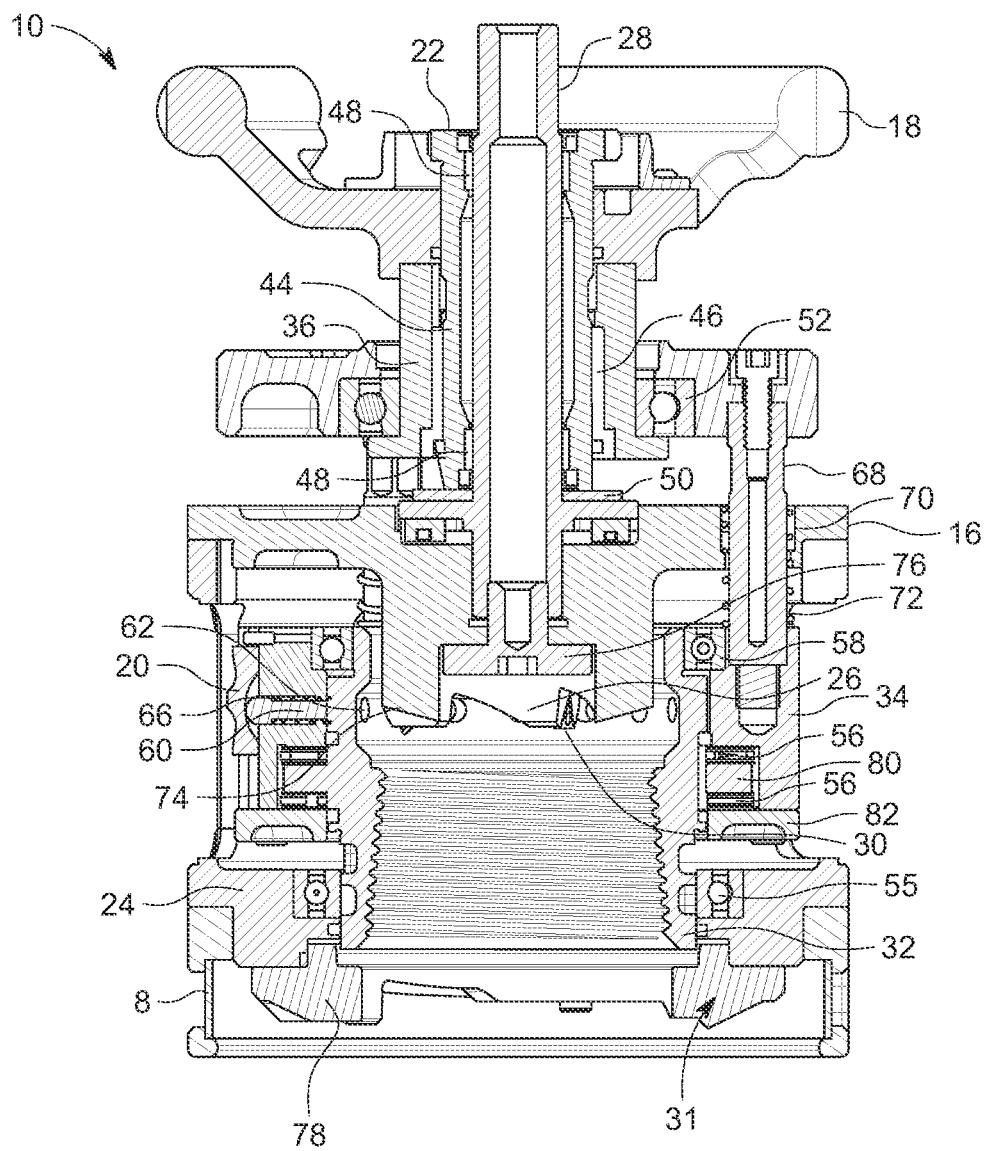
FIG. 6 is a sectional view of a cutting tool for refacing a pin end of a tubular.

Referring to FIG. 2, a tool for refacing tubular ends forming a threaded connection comprises a power tool 12, a cutting tool 10, and a releasable connection 14 for attaching the power tool 12 to the cutting tool 10 and for rotating a portion of the cutting tool 10. In some embodiments, such as shown in FIGS. 3 and 5, the cutting tool 10 is configured for refacing a box end of the second tubular 102b. In other embodiments, such as shown in FIGS. 4 and 6, the cutting tool 10 is configured for refacing a pin end of the first tubular 102a. Both configurations of the cutting tool 10 may share similar kinematics.

The power tool 12 may include a housing, a handle attached to the housing, a propeller shaft coupled to the housing by a hinged joint, and a motor (e.g., an electric motor) configured to provide a torque between the propeller shaft and the housing. Optionally, the power tool 12 may comprise a foot pedal and drive electronics configured to control the motor (e.g., the motor torque and/or the motor speed) based on a position of the foot pedal. In particular, the foot pedal and electronics may be configured to provide an auto shut-off emergency stop of the motor when an operator stops pressing on the pedal. A lever and/or a dead-man switch can be located near an adjustment handle 18 may be provided instead of, or in addition to, the foot pedal. The drive electronics configured to control the motor preferably maintains a rotation speed that is set by the operator. Preferably, the angular speed of the motor is measured with a tachometer and displayed to the operator. The power tool 12 is preferably portable and may be operated by a single operator. Power tools of other types (e.g., hydraulic power tools) and shapes may be used instead of the power tool 12 shown in FIG. 7.

Preferably, the cutting tool 10 may comprise a cam 20. The cam 20 may slide between an unlock position and a lock position. In the unlock position, the portion of the cutting tool 10 that is driven by the propeller shaft is free to rotate relative to the first tubular 102a or the second tubular 102b. In the lock position, rotations within the cutting tool 10 are prevented so that the cutting tool 10 can be threaded on the first tubular 102a or the second tubular 102b. In other embodiments, the cam 20 may be replaced by other switching mechanisms, such as a knob.

The refacing tool comprises the adjustment handle 18, the rotation of which is not coupled to the propeller shaft of the power tool 12. Instead, the operator can adjust the angular position of the adjustment handle 18. The angular position of the adjustment handle 18 is linked to the axial position of the end of the first tubular 102a or the end of the second tubular 102b relative to the portion of the cutting tool 10 that is driven by the propeller shaft of the power tool 12. The adjustment handle 18 is preferably made of polymer. The adjustment handle 18 may include an ergonomic wheel and spokes. The spokes may be shaped such that the ergonomic wheel is offset from the cutting tool.

Preferably, the cutting tool 10 may comprise windows 8. At least some of the windows 8 may include a transparent shield so that the operator can see surface defects that may need refacing and/or the cutters refacing the outer shoulder 106a,b of the first tubular 102a or the second tubular 102b, and the operator remains protected from metal shavings generated during refacing.

Turning to FIGS. 3 and 4, the cutting tool 10 comprises a sleeve assembly 44. The sleeve assembly 44 may be releasably attached to the housing of the power tool 12 (shown in FIG. 2) via a keyed connection 22, which may form a portion of the releasable connection 14 (also shown in FIG. 2).

The cutting tool 10 comprises a feed assembly, which may consist of a drive shaft 28, an outer barrel 24 rigidly coupled to the drive shaft 28, and an inner barrel 26 rigidly coupled to the drive shaft 28. The drive shaft 28 may be coupled to the propeller shaft of the power tool 12 by a prismatic joint, which may form another portion of the releasable connection 14 (shown in FIG. 2). The feed assembly is coupled to the sleeve assembly 44 by a hinged joint. As such, the feed assembly may be rotated by the motor of the power tool 12 (also shown in FIG. 2) as indicated by arrow 42.

Preferably, the inner barrel 26 may be positioned at least partially inside the outer barrel 24. For example, the inner barrel 26 may comprise a shaft, and the outer barrel 24 may comprise a cylinder that surrounds at least partially the shaft.

The cutting tool 10 comprises cutters. The cutters are coupled to the feed assembly so as to move in unison with the feed assembly. In FIG. 3, the cutters may be positioned so as to reface only the inner shoulder 104b, only the outer shoulder 106b, but preferably both the inner and outer shoulders of the box end of the second tubular 102b (shown in FIG. 2). The cutters are configured to minimize or eliminate any step that may occur at the intersection between the inner shoulder 104b and the inner diameter of the box end of the second tubular 102b. Additional cutters may optionally be provided to also reface inner chamfer, outer chamfers, and/or an inner diameter of the box end of the second tubular 102b. In FIG. 4, the cutters may be positioned so as to reface only the inner shoulder 104a, only the outer shoulder 106a, but preferably both the inner and outer shoulders of the pin end of the first tubular 102a (shown in FIG. 2). Additional cutters may optionally be provided to also reface inner and/or outer chamfers of the pin end of the first tubular 102a.

For example, the cutters may comprise at least a first cutter 30, which may be positioned so as to reface the inner shoulder of the tubular end, and at least a second cutter 31, which may be positioned so as to reface the outer shoulder 106a,b of the tubular end. The first cutter 30 may be rigidly coupled to the shaft forming the inner barrel 26 included in the feed assembly. The second cutter 31 may be rigidly coupled to the cylinder forming the outer barrel 24 included in the feed assembly. While only one first cutter 30 and one second cutter 31 are illustrated, several cutters may be provided to reface various surfaces of the inner shoulder and the outer shoulder simultaneously, such as a seal surface, a chamfer surface, and/or other surfaces of the shoulders. The cutters may have different orientations to reface surfaces that are not parallel.

The cutting tool 10 comprises a drive assembly 36. The drive assembly 36 is attached to the adjustment handle 18 (shown in FIG. 2) so that the operator can adjust the angular position of the drive assembly 36. The drive assembly 36 is coupled to the sleeve assembly 44 by a screw joint. Because the sleeve assembly 44 is releasably attached to the housing of the power tool 12 (shown in FIG. 2) via the keyed connection 22, the rotation of the sleeve assembly 44 may be prevented when the operator holds the power tool 12. As such, a change of angular position of the drive assembly 36 activates the screw joint, and a change of the axial position of the sleeve assembly 44 relative to the drive assembly 36 occurs, as indicated by arrow 40.

The cutting tool 10 comprises a mandrel assembly 32. The mandrel assembly 32 may include threads precisely configured to engage or match the threads of the tubular end. In FIG. 3, the mandrel assembly 32 is configured to engage the threads of the box end of the second tubular 102b (shown in FIG. 2). In FIG. 4, the mandrel assembly 32 is configured to engage the threads of the pin end of the first tubular 102a (shown in FIG. 2). For example, the threads may be designed as illustrated in U.S. Pat. Nos. 5,908,212; 5,931,511; or 6,447,025, or other threads provided by Grant Prideco™.

The cutting tool 10 comprises a rotating assembly 34. The rotating assembly 34 passes through the feed assembly such that the feed assembly may be capable of sliding relative to the rotating assembly 34. The rotating assembly 34 is coupled to the drive assembly 36 by a hinged joint. The rotating assembly 34 is also coupled to the mandrel assembly 32 by a hinged joint. As such, the rotating assembly 34 may rotate together with the drive shaft 28, the outer barrel 24, and an inner barrel 26 of the feed assembly without rotating either the drive assembly 36 or the mandrel assembly 32.

Further, under rotation of the drive assembly 36 relative to the sleeve assembly 44, the sleeve assembly 44 moves axially relative to the rotating assembly 34. The rotating assembly 34 and the mandrel assembly 32 do not move axially relative to each other and are coupled to the end of the first tubular 102a or the end of the second tubular 102b. The feed assembly holding the cutter moves axially together with the sleeve assembly 44. Thus, the operator can adjust the distance between the end of the first tubular 102a or the end of the second tubular 102b and the cutters by the rotation of the drive assembly 36 relative to the sleeve assembly 44.

Still further, the position of the drive assembly 36 is decoupled from the rotation of the feed assembly.

In use, the mandrel assembly 32 may be attached to and may be held in place by the tubular end having the shoulders to be refaced. The rotation of the sleeve assembly 44 may be hindered by the keyed connection 22 to the housing of the power tool 12, which may be held by an operator. The drive shaft 28 of the feed assembly may be rotated by the propeller shaft of the power tool 12. The drive shaft 28 may drive the rotation to the first cutter 30, the second cutter 31, and the rotating assembly 34. The feed assembly, the first cutter 30, and the second cutter 31 may be advanced toward or withdrawn from the mandrel assembly 32 and the shoulders to be refaced by the operator turning the drive assembly 36 via the adjustment handle 18 relative to the sleeve assembly 44. Other surfaces (inner shoulder, chamfers) can be refaced simultaneously as well. And the drive shaft 28 may not apply rotation to the drive assembly 36 and the adjustment handle 18.

Turning to FIGS. 5 and 6, the first set of cutter(s) used for refacing the inner shoulder and the second set of cutter(s) used for refacing the outer shoulder may optionally be secured to replaceable insert plates, which are detachable parts of the feed assembly. For example, the insert plates can be coupled to the remainder of the feed assembly via lock screws or other fasteners. In use, once the cutters secured to an insert plate are worn, the insert plate with the worn cutters can be decoupled from the remainder of the feed assembly, and a new insert plate having sharp cutters already properly positioned and secured thereto may be coupled to the remainder of the feed assembly. Providing replaceable insert plates with cutters already secured thereto may reduce the probability that an operator improperly mounts the cutters on the feed assembly. Further, the cutting tool 10 may be provided with a kit containing replaceable insert plates having different thicknesses. Accordingly, an operator may select different insert plates within the kit to modify the geometry of the feed assembly, and thus, the axial spacing between the first set of cutter(s) used for refacing the inner shoulder. For example, the cutter 30, and other like cutter(s), can be secured to a first insert plate 74, which may be shaped like a disc having pockets sized to receive and secure the cutters therein. The first insert plate 74 can then be coupled to the feed assembly via lock screw 76, or other locking mechanisms. Similarly, the cutter 31, and other like cutter(s), can be secured to a second insert plate 78, which may be shaped like a ring having pockets sized to receive and secure the cutters therein. The second insert plate 78 can then be coupled to the feed assembly via lock screws (not shown). In some embodiments, the cutters 30 and/or 31 may be directly secured to the first and/or second insert plates 74 and 78, respectively. In some embodiments, the cutters 30 and/or 31 may be mounted inside cartridges that are in turn secured to the first and/or second insert plates 74 and 78.

The feed assembly may include the draft shaft 28 connected to a flange 16. The hinge joint between the drive shaft 28 of the feed assembly and the sleeve assembly 44 may be provided by sleeve bearings 48 (e.g., made of various materials such as bronze and graphite), and thrust bearing 50 (e.g., made of various materials such as bronze). The thrust bearing 50 may be positioned between the flange 16 of the feed assembly and the sleeve assembly 44. The screw joint between the sleeve assembly 44 and the drive assembly 36 may be provided by threads 46 (e.g., having a pitch of 40 turns per inch). The hinged joint between the drive assembly 36 and the rotating assembly 34 may be provided by ball bearing 52. The ball bearing 52 may be positioned between a flange 84 of the drive assembly and a support 86 of the rotating assembly 34. The angular position of the drive assembly 36 can be adjusted manually by an operator using the adjustment handle 18. For the rotating assembly 34 to pass through the feed assembly, the rotating assembly 34 includes a plurality of rods 68 that are connected to the support 86, and the flange 16 of the feed assembly includes a plurality of holes 70, which are positioned to correspond to the rods 68. The holes 70 may be provided with sleeve bearings. Springs 72 may have one end pressed against the flange 16 of the feed assembly and the other end pressed against the rotating assembly 34 and may be positioned around one or more of the rods 68. The springs 72 may be used to ensure that the cutters remain biased away from the shoulders to be refaced until the feed assembly abuts the thrust bearing 50, and the rotating assembly 34 is urged against the ball bearing 52. Accordingly, the cutters can be engaged or disengaged from the shoulders without leaving marks.

The hinged joint between the rotating assembly 34 and the mandrel assembly 32 is provided by thrust bearings 56 and optionally by ball bearing(s) 58. In particular, the mandrel assembly 32 is provided with an outer flange 80, the thrust bearings 56 are positioned on both sides of the outer flange 80, and retained in a bearing cup formed in the rotating assembly 34 with a cap 82. As such, because the rotating assembly 34 is retained by the mandrel assembly 32, the feed assembly can apply force to either press the cutters against the shoulders to be refaced, or to withdraw the cutters from the shoulders to be refaced. In embodiments where the space to locate ball bearings 58 between the rotating assembly 34 and the mandrel assembly 32 is limited, such as in FIG. 5, one or more bearings 64 may alternatively or additionally be provided between the rotating assembly 34 and the shaft of the inner barrel 26.

In cases when the drive shaft 28 is rotated clockwise as viewed from the power tool 12 to reface the shoulders of the tubular, the handedness of threads 46 is preferably such that the drive assembly 36 should be turned counter-clockwise to advance the cutters toward the tubular end. Accordingly, a slight friction in the hinged joint between the drive assembly 36 and the rotating assembly 34, which would tend to turn the drive assembly 34 clockwise around the fixed sleeve assembly 44, would also tend to withdraw the cutters from the shoulders to be refaced. Similarly, in cases when the drive shaft 28 is rotated clockwise as viewed toward the power tool 12 to reface the shoulders of the tubular instead, the handedness of threads 46 is again preferably such that the drive assembly 36 should be turned counter-clockwise to advance the cutters toward the tubular end.

Ball bearings 55 may be used for guiding the outer barrel 24 around the mandrel assembly 32. In embodiments where the cutting tool 10 is configured for refacing a box end of the second tubular 102*b*, such as shown in FIG. 5, ball bearings 54 may optionally be used for guiding the shaft of the inner barrel 26 within the mandrel assembly 32.

A person having ordinary skill in the art may, however, utilize other known ways for providing the kinematics joints between the assemblies forming the cutting tool 10.

Preferably, the cutting tool 10 comprises the cam 20 and a locking pin 60 that can slide through the rotating assembly 34. The cam 20 is coupled to the rotating assembly 34 so as to slide between an unlock position, illustrated in FIGS. 5 and 6, and a lock position, not shown. In the unlock position, the cam 20 allows a spring 66 to urge the locking pin 60 in a first position, also illustrated in FIGS. 5 and 6. In the first position, the locking pin 60 does not engage the mandrel assembly 32. The first position may be utilized during refacing. In the lock position, the cam 20 retains the locking pin 60 in a second position, not shown. In the second position, the locking pin 60 engages one of a plurality of holes 62 provided in the mandrel assembly 32 and prevents rotation of the mandrel assembly 32 relative to the rotating assembly 34. The second position may be utilized when attaching the mandrel assembly 32 to the pin end of the first tubular 102*a* (shown in FIG. 2) by rotating the cutting tool 10. The second position may similarly be utilized when attaching the cutting tool 10 to the box end of the second tubular 102*b*. In other embodiments, the cam 20 may be replaced by a knob that may be configured to move the locking pin 60 between first and second positions upon twisting the knob.

In some embodiments, the cutting tool 10 may comprise a sensor indicative of an axial position of the cutters relative to the mandrel assembly 32. For example, the sleeve assembly 44 may comprise one or more marks, which may form a first graduated scale. The drive assembly 36 may also comprise one or more marks, which may form a second graduated scale. Alignment of the marks is indicative of the axial position of the cutters relative to the mandrel assembly 32. For example, the first graduated scale and the second graduated scale may form a Vernier. In some embodiments, the advancement of the cutters may be controlled with precision as small as 0.0005 inch.

The ability to control and quantify the axial position of the cutters relative to the mandrel assembly permits refacing shoulders in several runs. For example, the refacing of the shoulders can be performed in several steps, wherein the cutters are first advanced to a first axial position relative to the mandrel assembly, the shoulder surfaces are inspected, and the cutters are then advanced to a second axial position relative to the mandrel assembly.

Figure 7:
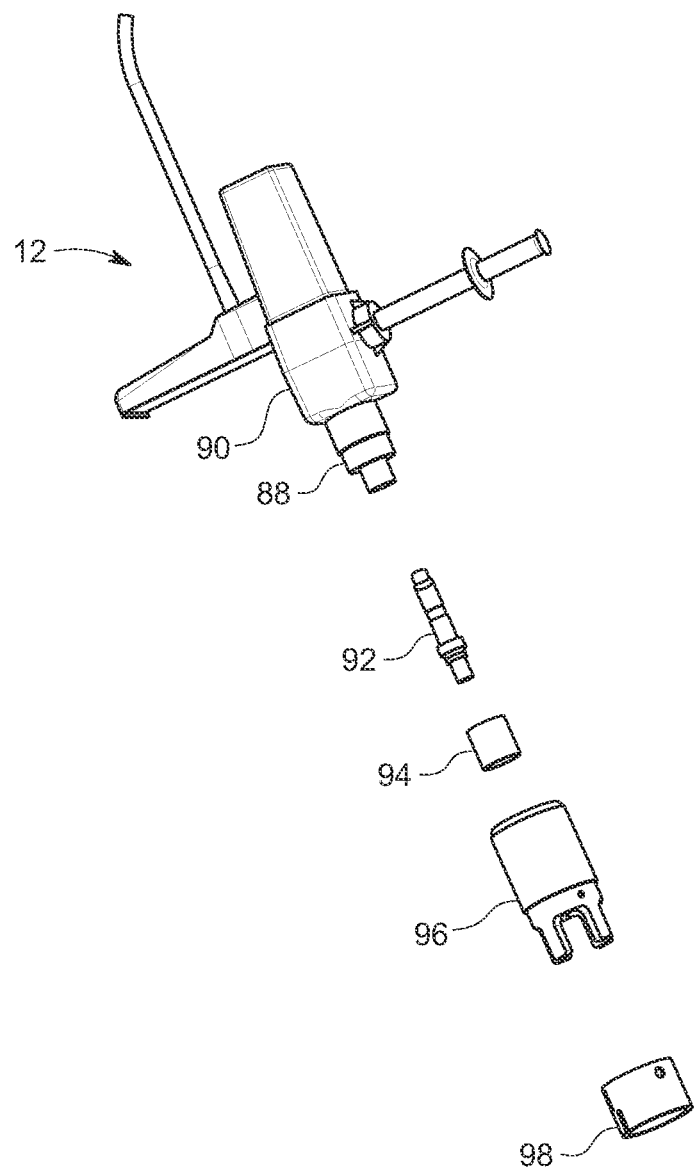
FIG. 7 is an exploded view of an attachable/releasable power tool.

Turning to FIG. 7, the power tool 12 includes the propeller shaft 88 coupled with an electric motor and a housing 90. A square connector 92 and drive socket 94 may be connected to the propeller shaft 88 to provide a quick connection between the propeller shaft 88 of the power tool 12 and the drive shaft 28 of the cutting tool 10. A pronged sleeve 96 may be connected to the housing 90 and may provide the keyed connection 22 previously described to the sleeve assembly 44. A shield 98 may be attached to the pronged sleeve 96. In some embodiments, the drive shaft 28, the square connector 92, and the drive socket 94 may form a unitary shaft directly couplable to the propeller shaft 88.

Figure 8:
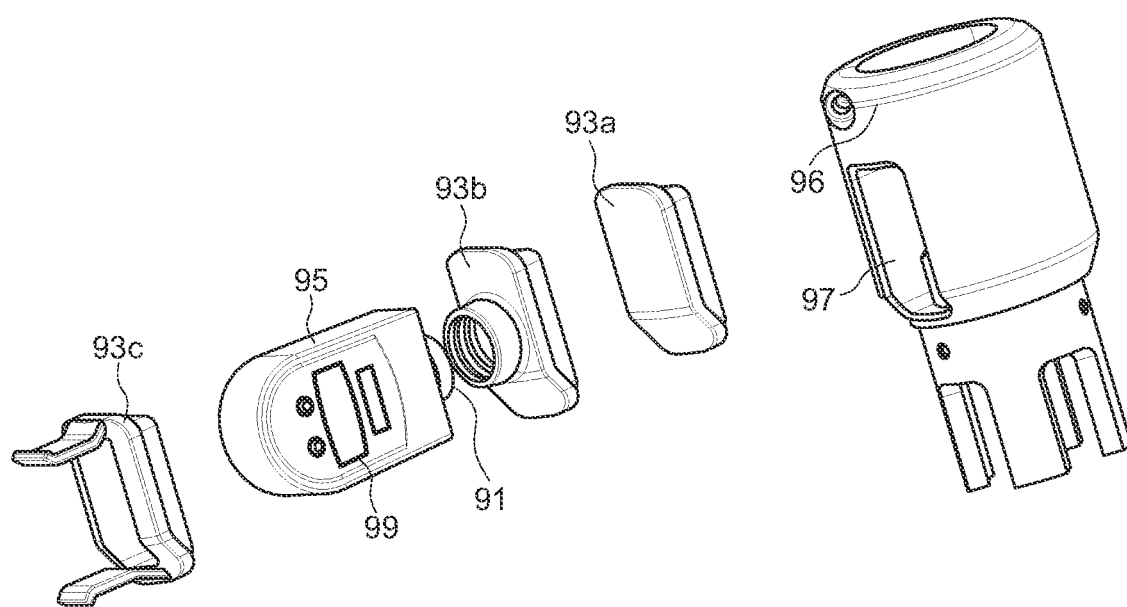
FIG. 8 is an exploded view of means for coupling a tachometer to an attachable/releasable power tool.

FIG. 8 shows an example of a tachometer 95 configured to measure the angular speed of the motor and display the measured angular speed to the operator on a screen 99. The tachometer is coupled to the pronged sleeve 96 via an adapter, which may be the adapter 93b or the adapter 93c. The adapter 93b and the adapter 93c are both shaped to be slid and restrained into a side opening 97 of the pronged sleeve 96. When restrained in the side opening 97, the adapter 93b and the adapter 93c align the tachometer 95 such that an optical sensor 91 of the tachometer 95 is in direct line of view of the square connector 92. Accordingly, the optical sensor 91 can detect the frequency at which one or more markers applied on the surface of the square connector 92 pass in front of the optical sensor 91 as the square connector 92 is rotated by the motor of the power tool 12. The adapter 93b includes a ring for holding and aligning the tachometer 95. The adapter 93c includes a clamp for holding and aligning the tachometer 95. If no tachometer 95 is used, the side opening 97 may be closed with a cap 93a, which is also shaped to be slid and restrained into a side opening 97. In embodiments where the drive shaft 28, the square connector 92, and the drive socket 94 form a unitary shaft, the makers may be applied to said shaft.

Figure 9:
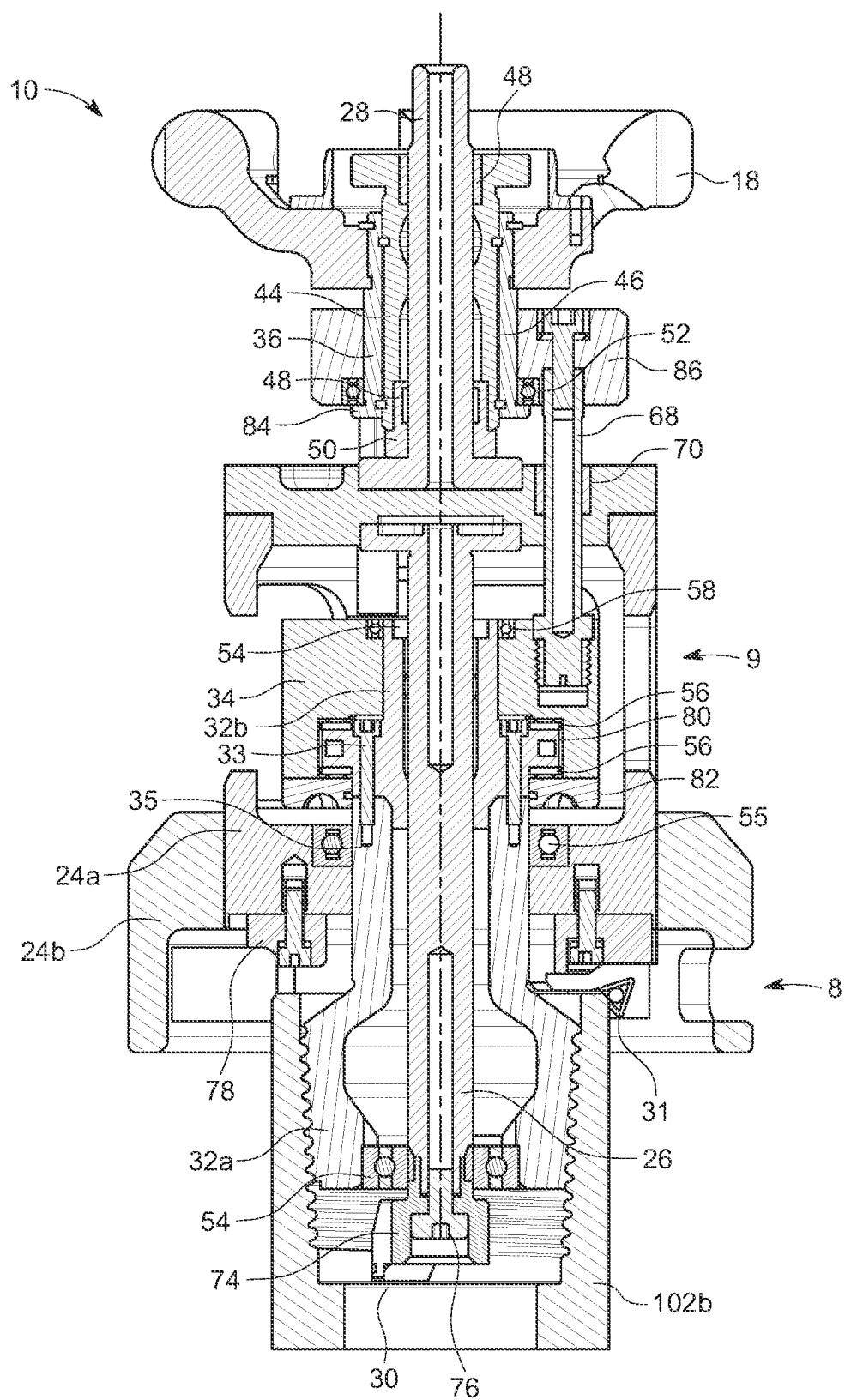
FIG. 9 is a sectional view of an alternative cutting tool for refacing a box end of a tubular.

FIG. 9 shows an alternative embodiment in which the cutting tool 10 is configured for refacing a box end of the second tubular 102b. The alternative embodiment shown in FIG. 9 has several similarities with the embodiment shown in FIG. 5. A difference from the embodiment shown in FIG. 5 is that the mandrel assembly is made of a first mandrel assembly portion 32a, and a second mandrel assembly portion 32b that is secured to the first mandrel assembly portion 32a, for example, via screws 33. The first mandrel assembly portion 32a includes threads precisely configured to engage or match the threads of the tubular end 102b. An upper end 35 of the first mandrel assembly portion 32a has a diameter which is smaller than a maximum diameter of the threads. The upper end 35 of the first mandrel assembly portion 32a engages the second mandrel assembly portion 32b and may include threaded holes to receive the screws 33. The second mandrel assembly portion 32b includes the outer flange 80. The maximum diameter of the outer flange 80 is also smaller than the maximum diameter of the threads. Accordingly, there is sufficient space to include bearing 58.

Also, the size of the rotating assembly 34 is smaller than in the embodiment shown in FIG. 5, so that the cutting tool 10 is lighter.

Another difference from the embodiment shown in FIG. 5 is that the outer barrel is made of a first outer barrel portion 24a, and a second outer barrel portion 24b that is secured to the first outer barrel portion 24a. The second insert plate 78 is coupled to the first outer barrel portion 24a via lock screws. The second outer barrel portion 24b may be used as a shaving deflector, and as such, comprises windows 8. The size of the first outer barrel portion 24a is smaller than the size of the outer barrel 24 shown in FIG. 5 so that the cutting tool 10 is lighter. The size of the second outer barrel portion 24b is similar to the size of the outer barrel 24 shown in FIG. 5, so that the second outer barrel portion 24b surrounds the first outer barrel portion 24a, and is larger than the outer diameter of the second tubular 102b.

Figure 10:
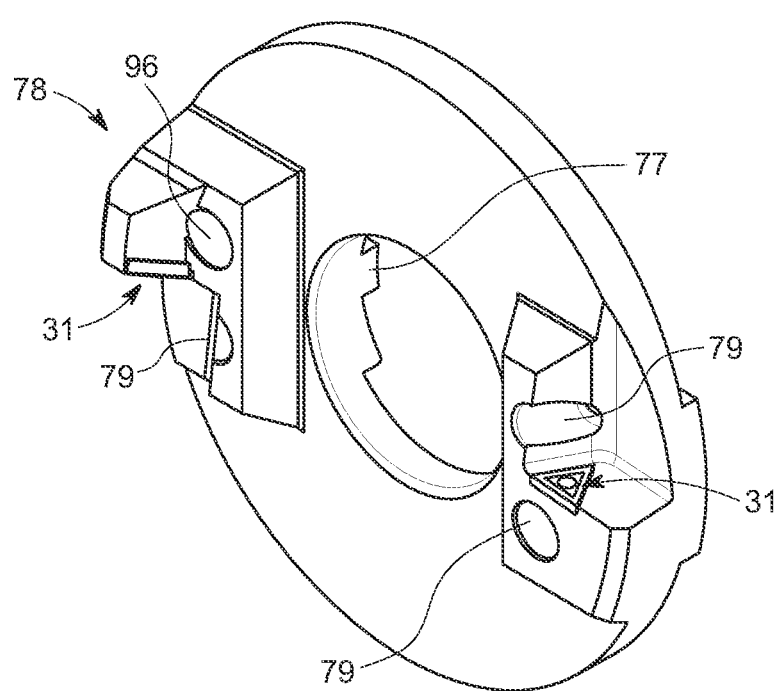
FIG. 10 is a perspective view of an insert plate.

FIG. 10 shows the second insert plate 78 of the cutting tool 10 shown in FIG. 9. The embodiment of the second insert plate 78 shown in FIG. 10 has several similarities with the embodiment of the second insert plate 78, shown in FIG. 5. Thanks to the size of the first outer barrel portion 24a of the feed assembly being smaller than in the embodiment shown in FIG. 5, holes 79, which are used for receiving lock screws to couple the second insert plate 78 to the first outer barrel portion 24a, can be located closer to the drive shaft 28, for example, closer than the cutters 31. One or more keys 77 are made integral to the plate 78. The one or more keys 77 are sized to engage corresponding grooves in the first outer barrel portion 24a of the feed assembly.

Figure 11:
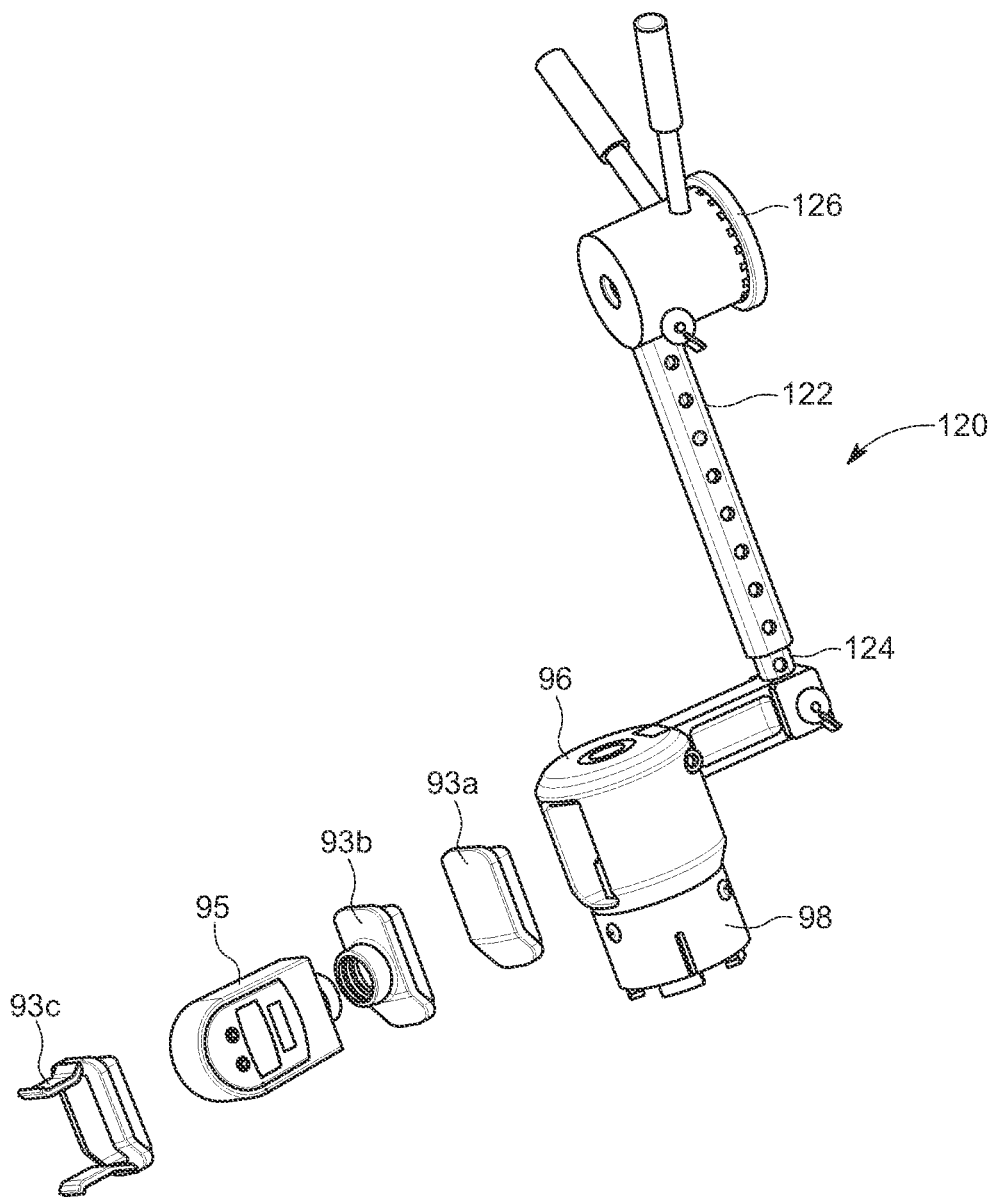
FIG. 11 is an exploded view of alternative means for coupling a tachometer to an attachable/releasable power tool.

FIG. 11 shows an alternative embodiment of means for coupling a tachometer to an attachable/releasable power tool. The alternative embodiment shown in FIG. 11 has several similarities with the embodiment shown in FIG. 8. A difference from the embodiment shown in FIG. 8 is that the pronged sleeve 96 is connected to a telescopic handle 120. For example, the telescopic functionality may be achieved using a perforated outer shaft 122 that slides over a rod 124 and is coupled thereto via a prismatic joint. The length of the handle 120 can be extended or contracted to a desired value, and then the perforated outer shaft 122 can be locked to the rod 124 using a pin that engages one of the perforations of the outer shaft 122. The disc 126 has a serrated surface that engages a corresponding serrated surface on the telescopic handle 120 so that the disc 126 can be rotated.

In other embodiments, a gear (e.g., a planetary gear) can be provided between the propeller shaft 88 of the power tool 12 and the drive shaft 28 of the cutting tool 10.

In some embodiments, holes or apertures may be provided in the parts forming the cutting tool 10 for reducing a weight of the cutting tool 10 provided that the holes or apertures do not compromise the use of the cutting tool 10. Alternatively or additionally, the parts forming the cutting tool 10 (e.g., portions of the rotating assembly 34) may be made of light metals or alloys, such as aluminum, or polymers.

Specific embodiments of the invention are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A tool for refacing a tubular end having an inner shoulder, an outer shoulder, and threads for forming a connection, the refacing tool comprising:

a sleeve assembly;

a feed assembly coupled to the sleeve assembly by a first hinged joint;

cutters coupled to the feed assembly so as to move in unison with the feed assembly, the cutters being positioned so as to reface the inner shoulder or the outer shoulder of the tubular end;

a drive assembly coupled to the sleeve assembly by a screw joint;

a rotating assembly coupled to the drive assembly by a second hinged joint, the rotating assembly passing through the feed assembly, and the feed assembly being capable of sliding relative to the rotating assembly; and a mandrel assembly coupled to the rotating assembly by a third hinged joint, the mandrel assembly including threads configured to directly complement and engage the threads of the tubular end, whereby position of the drive assembly is decoupled from rotation of the feed assembly.

2. The refacing tool of claim 1, the cutters comprising:

at least a first cutter positioned so as to reface the inner shoulder of the tubular end; and at least a second cutter positioned so as to reface the outer shoulder of the tubular end.

3. The refacing tool of claim 1, the cutters being secured to at least one insert plate, and the at least one insert plate is releasably coupled to the feed assembly.

4. The refacing tool of claim 3, wherein a key is integral to the at least one insert plate comprises a key, wherein the key is sized to engage a corresponding groove in the feed assembly.

5. The refacing tool of claim 1, the feed assembly comprising:

a drive shaft;

an outer barrel rigidly coupled to the drive shaft; and an inner barrel rigidly coupled to the drive shaft, the inner barrel being positioned at least partially inside the outer barrel.

6. The refacing tool of claim 5, the inner barrel comprising a shaft, and at least one of the cutters being rigidly coupled to the shaft.

7. The refacing tool of claim 5, the outer barrel comprising a cylinder, and at least one of the cutters being rigidly coupled to the cylinder.

8. The refacing tool of claim 7, the outer barrel comprising windows located near the at least one of the cutters rigidly coupled to the cylinder.

9. The refacing tool of claim 8, the outer barrel comprising a first outer barrel portion and a second outer barrel portion that surrounds the first outer barrel portion, wherein the windows are provided in the second outer barrel portion.

10. The refacing tool of claim 8, wherein at least some of the windows include a transparent shield.

11. The refacing tool of claim 1, further comprising a locking pin coupled to the rotating assembly so as to slide between a first position, wherein the locking pin does not engage the mandrel assembly, and a second position wherein the locking pin engages the mandrel assembly and prevents rotation of the mandrel assembly relative to the rotating assembly.

12. The refacing tool of claim 11, further comprising a cam coupled to the rotating assembly so as to slide between an unlock position, wherein the cam allows a spring to urge the locking pin in the first position, and a lock position, wherein the cam retains the locking pin in the second position.

13. The refacing tool of claim 1, further comprising a sensor indicative of an axial position of the cutters relative to the mandrel assembly.

14. The refacing tool of claim 13, the sleeve assembly comprising marks forming a first graduated scale, and the drive assembly comprising marks forming a second graduated scale, whereby alignment of the marks is indicative of the axial position of the cutters relative to the mandrel assembly.

15. The refacing tool of claim 14, the first graduated scale and the second graduated scale forming a Vernier.

16. The refacing tool of claim 1, the first hinged joint comprising a thrust bearing positioned between a flange of the feed assembly and the sleeve assembly, the refacing tool further comprising at least a spring having one end pressed against the feed assembly and the other end pressed against the rotating assembly to urge the feed assembly against the thrust bearing.

17. The refacing tool of claim 16, the flange having at least one hole, the rotating assembly comprising at least one rod passing through the at least one hole, and the at least one spring being positioned around the at least one rod.

18. The refacing tool of claim 1, the second hinged joint comprising a ball bearing positioned between a flange of the drive assembly and the rotating assembly, the refacing tool further comprising at least a spring having one end pressed against the feed assembly and the other end pressed against the rotating assembly to urge the rotating assembly against the ball bearing.

19. The refacing tool of claim 18, the rotating assembly comprising at least one rod passing through a hole in the feed assembly, and the at least one spring being positioned around the at least one rod.

20. The refacing tool of claim 1, the mandrel assembly including an outer flange, the third hinged joint comprising thrust bearings positioned on both sides of the outer flange and retained in a bearing cup formed in the rotating assembly with a cap.

21. The refacing tool of claim 20, wherein a diameter of the outer flange is smaller than a maximum diameter of the threads of the mandrel assembly.

22. The refacing tool of claim 21, wherein the mandrel assembly includes a first portion that includes the threads and is secured to a second portion that includes the outer flange.

23. The refacing tool of claim 1, further comprising a power tool including:

a housing attached to the sleeve assembly;

a handle attached to the housing;

a propeller shaft coupled to the housing by a fourth hinged joint and coupled to the feed assembly by a prismatic joint; and a motor configured to provide a torque between the propeller shaft and the housing.

24. The refacing tool of claim 23, the power tool further comprising a foot pedal and drive electronics configured to control the motor based on a position of the foot pedal.

25. The refacing tool of claim 23, the motor being configured to rotate the feed assembly clockwise, and the screw joint being configured such that rotating the drive assembly counter-clockwise causes the cutters to advance toward the tubular end.

26. The refacing tool of claim 23, wherein the housing is attached to the sleeve assembly via a pronged sleeve shaped to form a keyed connection with the sleeve assembly and wherein the propeller shaft is coupled to the feed assembly by a square connector and a drive socket.

27. The refacing tool of claim 26, further comprising a tachometer releasably coupled to the pronged sleeve with an adapter, the tachometer including a sensor in direct line of view of the square connector, and a screen for displaying a measured angular speed of the motor.

28. A method of refacing a tubular end having an inner shoulder, an outer shoulder, and threads for forming a connection, the method comprising:
  providing a refacing tool including:
    a sleeve assembly;
    a feed assembly coupled to the sleeve assembly by a first hinged joint;
    cutters coupled to the feed assembly so as to move in unison with the feed assembly, the cutter being positioned so as to reface the inner shoulder or the outer shoulder of the tubular end;
    a drive assembly coupled to the sleeve assembly by a screw joint;
    a rotating assembly coupled to the drive assembly by a second hinged joint, the rotating assembly passing through the feed assembly, and the feed assembly being capable of sliding relative to the rotating assembly; and
    a mandrel assembly coupled to the rotating assembly by a third hinged joint, the mandrel assembly including threads configured to directly complement and engage the threads of the tubular end;
  whereby position of the drive assembly is decoupled from rotation of the feed assembly;
  coupling the threads of the tubular end to the threads of the mandrel assembly;
  applying a torque to the feed assembly;
  positioning the drive assembly to advance the cutters toward the tubular end while rotating the cutters; and
  refacing the inner shoulder or the outer shoulder of the tubular end.

29. The method of claim 28 further comprising refacing the inner shoulder and the outer shoulder of the tubular end simultaneously.

30. The method of claim 29 further comprising refacing the inner shoulder, the outer shoulder, and at least one chamfer of the tubular end simultaneously.

* * * * *